United States Statutory Invention Registration [19]

[11] Reg. Number: H714

McDowell [43] Published: Nov. 7, 1989

[54] SERIAL DATA WORD PROCESSING ARRANGEMENT

[75] Inventor: Vaughn P. McDowell, Fredericksburg, Va.

[73] Assignee: The United States of America as represented by the Secretary of the Navy, Washington, D.C.

[21] Appl. No.: 112,579

[22] Filed: Oct. 26, 1987

[51] Int. Cl.[4] ..... G06F 3/153
[52] U.S. Cl. ..... 364/900
[58] Field of Search ... 364/200 MS File, 900 MS File

[56] References Cited

U.S. PATENT DOCUMENTS

| | | | |
|---|---|---|---|
| 4,040,025 | 8/1977 | Morrill, Jr. et al. | 364/900 |
| 4,128,900 | 12/1978 | Lappington | 365/94 |
| 4,479,197 | 10/1984 | Haag et al. | 364/900 |
| 4,514,798 | 4/1985 | Lesche et al. | 364/140 |
| 4,623,984 | 11/1986 | Yokokawa et al. | 364/900 |
| 4,799,144 | 1/1989 | Parruck et al. | 364/200 |

OTHER PUBLICATIONS

"Practical Hardware Details for the 8080, 8085, Z80, and 6800 Microprocessor Systems", James W. Coffron, 1981, pp. 280–286.

*Primary Examiner*—Thomas H. Tarcza
*Assistant Examiner*—Linda J. Wallace
*Attorney, Agent, or Firm*—John D. Lewis; William C. Townsend; Elmer E. Goshorn

[57] ABSTRACT

A serial data word processing arrangement which can be used as a hand held security access control is disclosed. A microprocessor and electronically erasable and programmable red only memory chips (EEPROM), are used in a novel manner for storing security codes or other data resulting in a device that retains memory even after loss of power.

1 Claim, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SERIAL DATA WORD PROCESSING ARRANGEMENT

This invention concerns a serial data word processing arrangement of microconstruction and, more particularly, it relates to an improved serial data word processing arrangement of microconstruction for handling a data word input having a predetermined number of binary encoded bits and for either storing a data word input or comparing a data word input with a previously stored input.

BACKGROUND OF THE INVENTION

Various types of data processing arrangements have been designed in the past. For example, U.S. Pat. No 4,128,900 to J. P. Lappington discloses a programmable read only memory (PROM) for use with an electronic engine control. The control is generally made up of a set of selected engine parameter sensors, a microprocessor, a programmed memory and an input/output integrated circuit. The circuit correlates the inputs of the microprocessor and the set of parameter sensors so as to provide an output for precisely and timely controlling the output of the engine ignition system for better engine performance. Since the engine control is normally a single package for mass production auto manufacture, the control has to be periodically modified to meet the performance requirements of more than one engine. Accordingly the PROM is connectable between th microprocessor and the programmed memory in order to tailor the control in meeting the particular performance requirements of an engine to which the control is installed. U.S. Pat. No. 4,514,798 to W. Lesche et al. concerns a multimode control apparatus. The apparatus is generally made up of a microprocessor, a programmable memory, an input/output unit, a pair of operator-settable parameters, a process monitor and a pair of manually operable mode-setting switches. Depending on the manner in which the pair of parameters are set, the microprocessor and memory function to provide a controlled output to the apparatus being controlled. However, none of the aforediscussed references recognized the importance of providing an improved data word processing arrangement for handling more than one data word input and for providing a controlled output when a data word input compares with a previously stored data word input.

In the use of data processing arrangements, it is advantageous to provide a programmable data link for controlling one or more output components of the processing arrangement. In providing such control, e.g., security can be maximized and only certain components could be operable depending on the particular encoding of the data word output Accordingly, the improved data word processing arrangement is advantageously of microconstruction and is comprised of a dual mode microprocessor and an EEPROM. The microprocessor is capable of handling any number of different encoded multibit data words that is only limited by the memory capacity of the EEPROM. By reason of the EEPROM, one series of different data words can be stored then another, etc., so that the arrangement has maximum utilitv in storing and comparing data words in serving as a data control link for any data processing system including any mechanism associated therewith.

SUMMARY OF THE INVENTION

An object of the invention is to provide an improved data word processing arrangement of microconstruction that readily can be retrofitted into an existing data processing system.

Another object of the invention is to provide an improved data word processing arrangement of microconstruction that can be used for storing a serial data input and for comparing stored data with a data input.

Still another object of the invention is to provide an improved data word processing arrangement that can permanently store a variety of data and compare the stored data with a data input and as the result of the comparison for acceptance or rejection of the data input, the improved arrangement serves as a data control link or security arrangement for a data processing system.

In summary, the improved serial data word processing arrangement is generally made up of a microprocessor and an electronically erasable and programmable read only memory device (EEPROM) operatively connected to the microprocessor. Power supply means is connected to the microprocessor for energizing the same. The microprocessor is advantageously programmed for operating in either one of two modes, one for storing a binary encoded data word input, and another for comparing a stored data word input with a data word input. An output is connected to the microprocessor that can be used for indicating when a data word input compares with a stored data word input.

In order to minimize power requirements of the arrangement, energization of the EEPROM is controlled by the microprocessor and is effected in an intermittent fashion when a data word is being stored or a stored data word is being removed. The microprocessor is advantageously and preferably programmed to handle a data word input made up of at least a plurality of three successive serial bytes with each byte being an 8-bit word and to divide up the plurality of bytes into a set of three separate single bytes for processing. During processing each byte is converted into parallel format. Further, a data word input may also include a key pulse bit. In order to enable the arrangement to handle more than one data word input for either storage or comparison with the stored data and to substantially use the memory capacity of the EEPROM an address means between the microprocessor and the EEPROM is provided with a set of manually operable switch means for selecting more than one area of the EEPROM for effecting either storing the plurality of three bytes of a given data word input or removing a stored data word input for comparison purposes with a data input.

In another embodiment of the data word processing arrangement an enhanced address means is provided between the microprocessor and the EEPROM operatively associated therewith. To this end, the address means is comprised of a novel manually operable switch means for selectively connecting a memory area of the EEPROM when a data word input is to be stored therein. Further, the enhanced address means directly connects the processor means to the EEPROM when a data word input of the processor means is compared (decoded) with all stored data word inputs of the EEPROM. One of the purposes of the decode mode is for identifying a stored data word input of the EEPROM that compares with and corresponds to a data word input of the processor means.

Other objects and advantages of the invention will become apparent when taken in conjunction with the accompanying drawings and the specification.

DETAILED DESCRIPTION OF THE INVENTION

Figure 1:
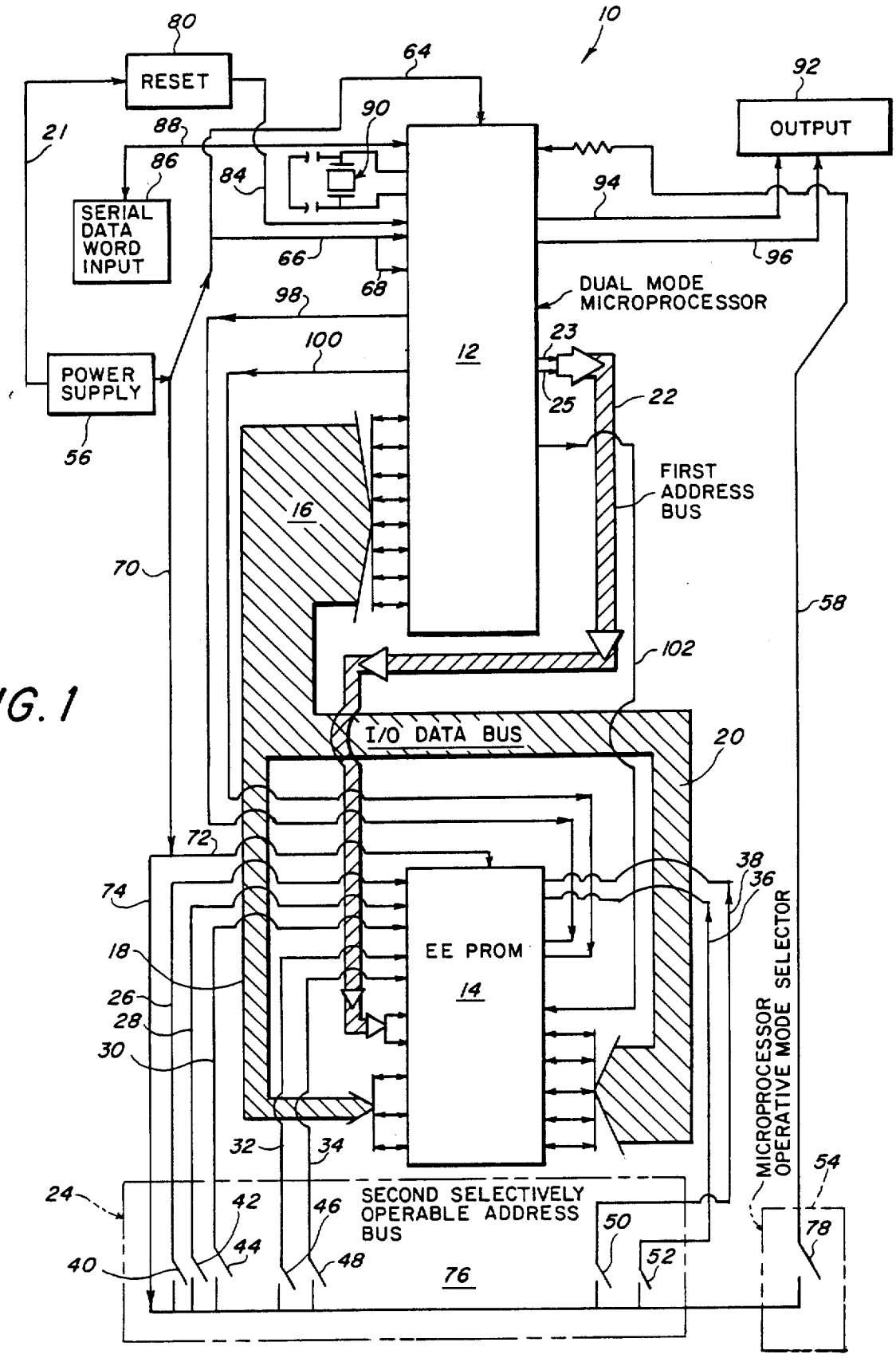
FIG. 1 is a diagrammatic view of an embodiment of the improved serial data word processing arrangement of the invention.

With further reference to FIG. 1, an improved serial data word processing arrangement 10 is generally made up of a dual mode microprocessor 12 and an electronically erasable and a programmable read only memory (EEPROM) 14. An 8-bit parallel word input/output (I/O) data bus 16 having eight leads interconnects the microprocessor and the EEPROM. By reason of three data I/O ports being located on one side of the EEPROM and five data I/O ports being located on the other side thereof, data bus 16 is provided with branch portions 18 (having three leads) and 20 (having five leads). A first address bus 22 having two leads 23 and 25 interconnects the microprocessor and the EEPROM. A selectively operable second address bus 24 is comprised of a set of seven leads 26, 28, 30, 32, 34, 36 and 38. Five of the seven leads of the address bus 24 are connected to one side of EEPROM 14 while two leads of the set of seven leads of address bus 24 are connected to the other side thereof all as evident in FIG. 1. Each lead 26, 28, 30, 32, 34, 36 and 38 of bus 24 is provided with a series connected and selectively operable manual switch 40, 42, 44, 46, 48, 50, and 52.

Arrangement 10 is provided with an operative mode selector 54 and a power supply 56. An output lead 58 of selector 54 is connected to processor 12 as illustrated in FIG. 1. Power supply 56 is provided with a set of parallel interconnected output leads 60, 62, 64, 66 and 68 for enabling processor 12 during its use. Similarly, power supply 56 with its output 60 and set of parallel interconnected leads 70, 72 and 74 is connected to EEPROM 14, and an input 76 for both second address bus 24 and mode selector 54. Selector 54 is provided with a manually operable switch 78 that is series connected between output 58 and input 76. As required, a reset 80 is connected by an input lead 82 from supply 56 and is also connected by an output lead 84 to processor 12. A serial data word input 86 is connected by an output lead 88 to processor 12. The oscillator circuit of processor 12 is completed by a crystal-capacitor circuit 90 as depicted in FIG. 1. An output of a suitable visual display 92 is connected to processor 12 by a pair of output leads 94 and 96. Memory write and read only control leads 98 and 100 are connected between processor 12 and EEPROM 14. An output lead 102 of processor 12 is connected to EEPROM 14 for controlling the enablement of the EEPROM by supply 56 only when a data word input from input 86 is received by processor 12 for either encoding (storing) or decoding (comparing) with a prior stored data word input when arrangement 10 is used as will become more fully apparent hereinafter. It is to be understood, that the particular manner in which processor 12 and EEPROM 14 are programmed and interconnected by leads, data bus, address bus, etc. is believed to be within the appropriate skills of both a processor designer and programmer.

Figure 2:
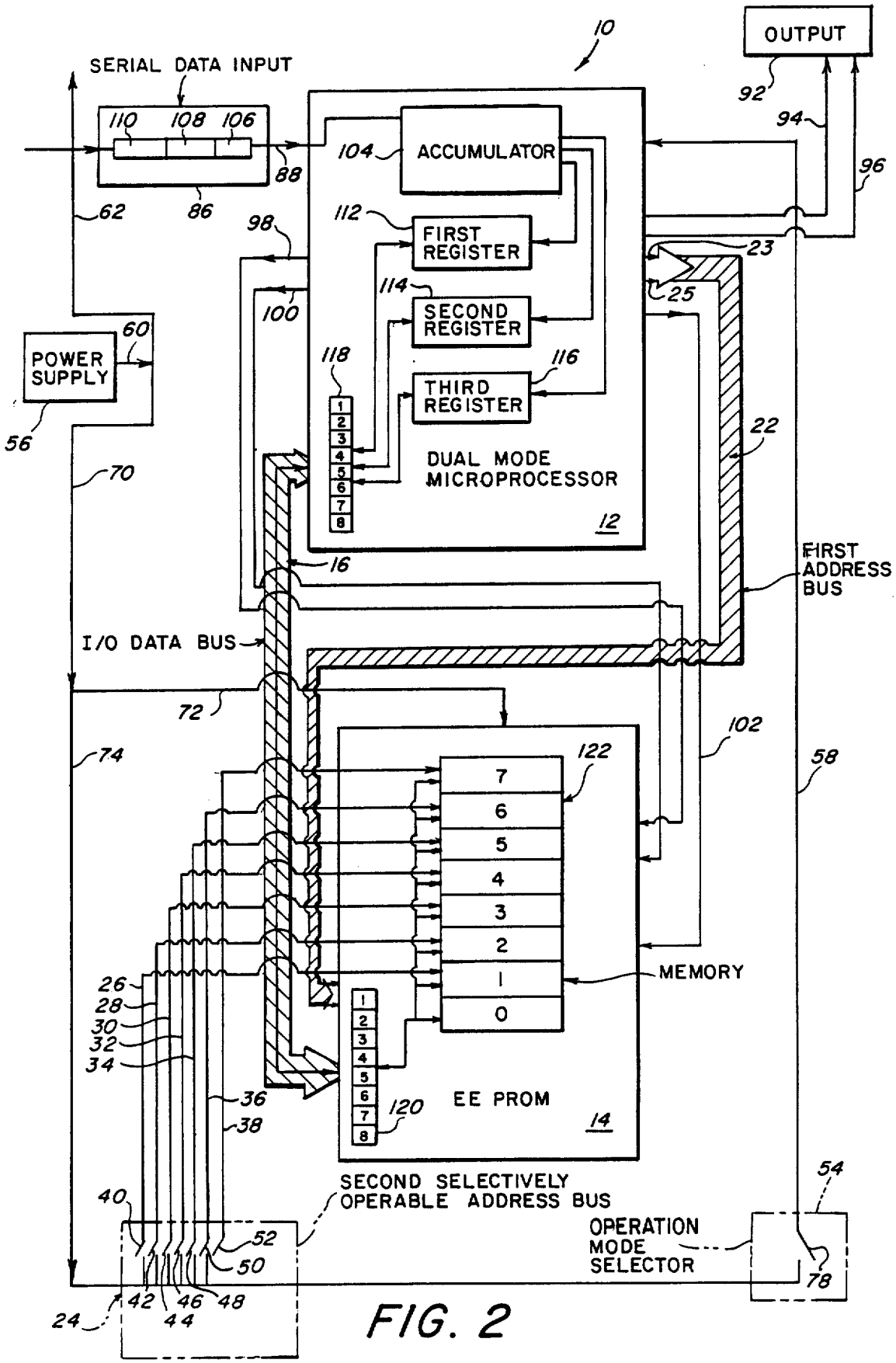
FIG. 2 is another diagrammatic view similar to FIG. 1 with parts added, other parts rearranged and still other parts removed and further illustrates details of the invention.

As further evident in FIG. 2, processor 12 is generally made up of an accumulator 104 for receiving a multibit serial data word (stream) from input 86. The data word is provided with a set of three successive serial bytes 106, 108 and 110 with each byte being eight bits. The data word is also provided with a bit location not shown) that serves as a key pulse for indicating that the serial data stream has been received by processor 12 for either encoding or decoding depending upon the mode selected for processor 12 by selector 54. Processor 12 is also comprised of three registers 112, 114 and 116. As depicted in FIG. 2 during operation of processor 12 when a serial data word is received in accumulator 104 each serial byte 106, 108 or 110 is first converted from serial format to parallel format before each converted byte is transferred to its associated register 112, 114 or 116 respectively. In other words, each byte 106, 108 or 110 of a data word input 86 is received in the accumulator!t is immediately outputted in parallel format prior to the next byte of the data word input being received. Assuming that the processor is operating in the encoding mode, first register 112 transfers a parallel byte of an input to a data port of the processor as represented by element 118 for effecting transfer via data bus 16 to a data port of EEPROM 14 as represented by element 120 therein. After the first byte is transferred from processor 12 to EEPROM 14 then the second and third parallel bytes of registers 114 and 116 are also successively transferred in similar fashion to EEPROM.

These functions are accomplished by conventional software corresponding to the architecture of the particular microprocessor selected.

Figure 3:
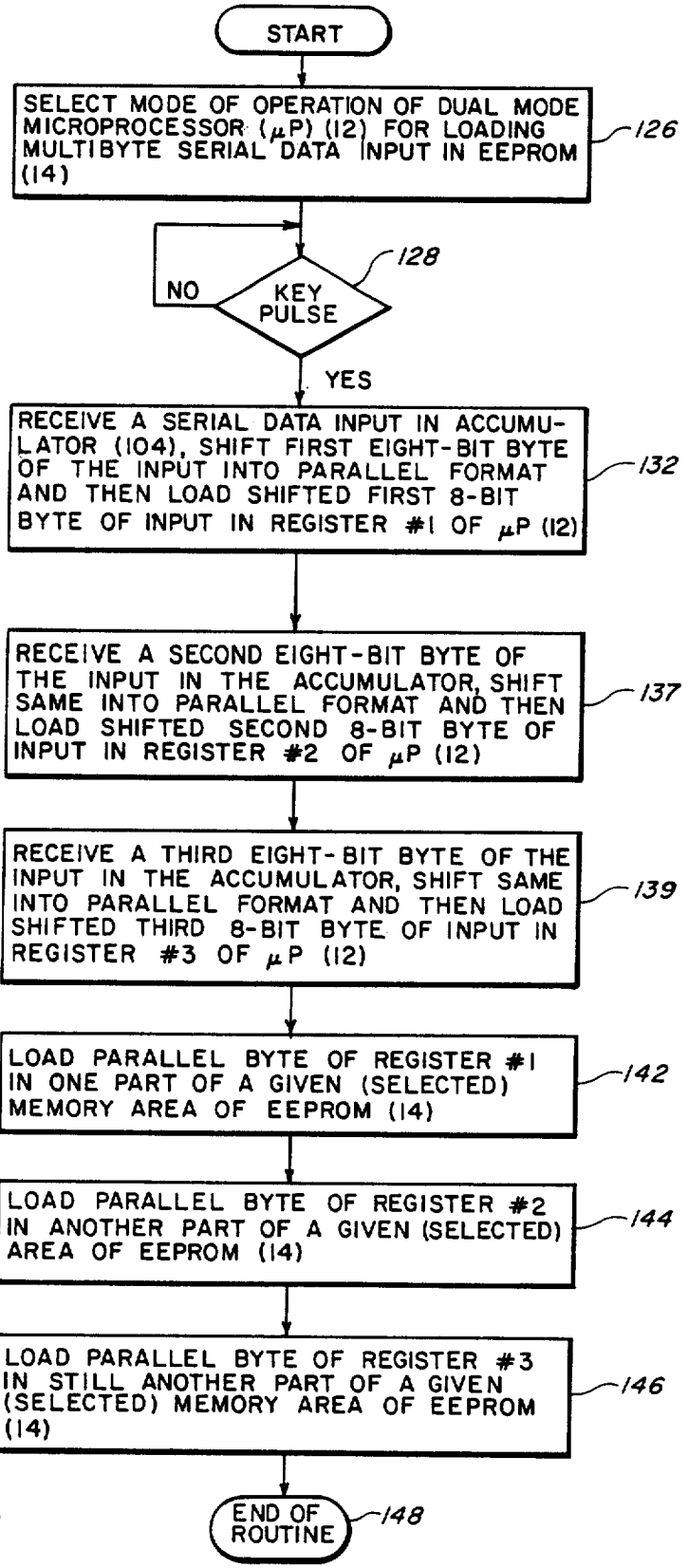
FIG. 3 is a schematic view of a flow chart for an operative embodiment of the invention when it is in an encoding operative mode.

As further disclosed in FIG. 2, EEPROM 14 is provided with a memory 122 that is divided up into eight storage areas designated zero through seven (0 through 7) where each storage area stores a set of three parallel bytes (e.g., the parallel converted series of three set bytes 106, 108, and 110 of a set data stream). Assuming that all seven switches 40, 42, 44, 46, 48, 50 and 52 of address bus 24 are open then each transferred parallel byte of a three-byte data stream is stored in its respective part of memory area designated zero. .On the other hand, if any switch of address bus 24 is closed, then each parallel byte of a three-byte data stream is stored in its respective part of the designated area of memory 122 associated with a given closed switch (e.g., operator closed switch 44 is associated with memory area designated 3). Hence, by reason of selective address bus 24 efficient utilization of the memory of EEPROM 14 is attained by arrangement 10 during processor 12 use. It is noted here that the particular manner in which leads 72 and 102 are interconnected to memory 122 and the particular manner in which leads 98 and 100 are connected to memory 122 is believed to be within the skill of the art In an operative embodiment of arrangement 10 for encoding a set data word input, reference is made to the flow chart of FIG. 3. Processor 12 is initialized by the operator by being connected to power supply 56 as indicated by "start" block 124. Then the operator leaves mode selector switch 78 in the open position as confirmed by block 126. At this time processor 12 transmits a command signal via memory write control lead 98 and also a signal via lead 102 for enabling EEPROM 14 by power supply input 72. As processor 12 cycles, decision block 128 will indicate when a key pulse has been received. As the first byte of a data input stream 86 is received in accumulator 104 it is then unloaded in parallel format to its associated register 112, see block 132. Similarly, as the second and third bytes of the data input stream are timely and successively received in accumulator 104, they are each outputted in parallel format and then loaded in their associated registers 114 and 116 before another byte is received by the accumulator, steps 137 and 139. After the three bytes of a data stream are stored in their respective registers of processor 12, each byte beginning with the first byte of a data stream is successively transferred from processor 12 via data bus 16 to EEPROM 14 and a given area of memory 122 thereof as indicated by program blocks 142, 144 and 146. Assuming that all switches of address bus 24 are open, then all three parallel bytes of a data stream would be stored in their respective parts of memory 122 at its area designated "0". On the other hand, if any switch of bus 24 is closed, e.g., switch 48 is closed then memory area designated "5" would store all three bytes. As indicated by block 148 the encoding routine is now ended until the next data stream is received in accumulator 104 during use of arrangement 10 in the encoding mode.

Figure 4A:
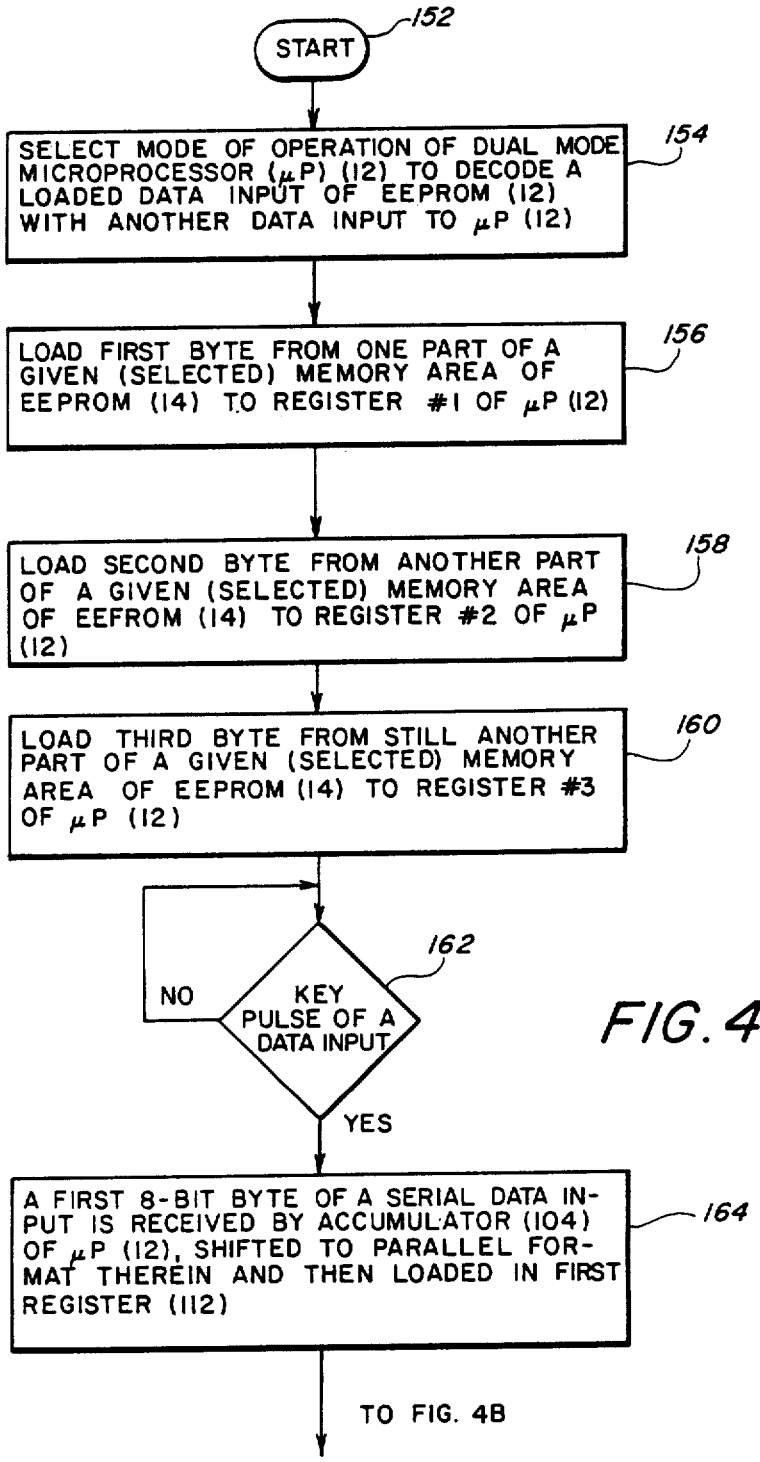
FIGS. 4A and 4B are schematic views of a flow chart for another operative embodiment of the invention when it is in a decoding or comparative mode.
Figure 4B:
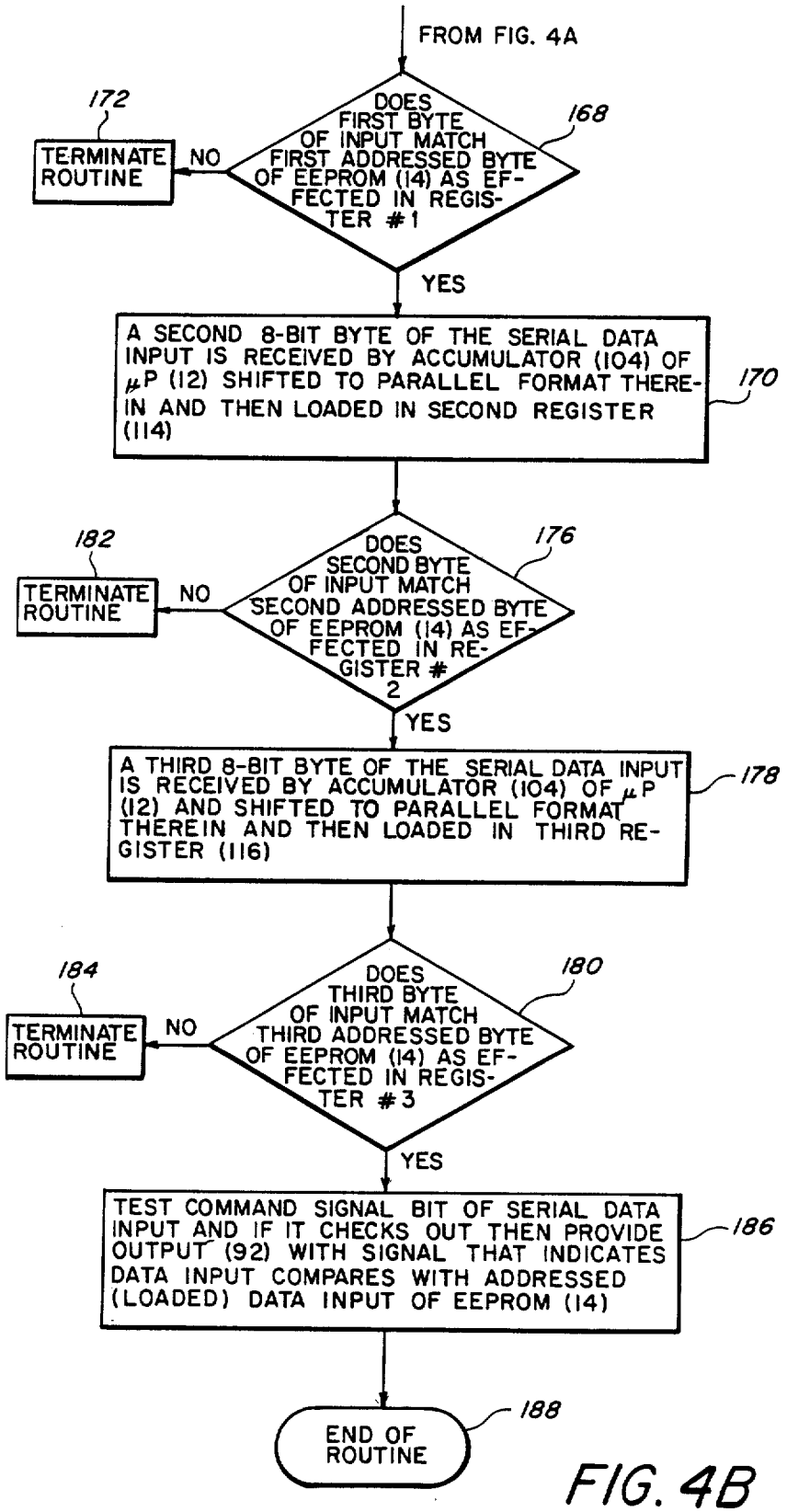

It is now assumed that mode selector switch 78 is closed thereby indicating to processor 12 to operate in the decode or stored data/data input comparison mode as specified by blocks 152 and 154 of FIG. 4A. In order for processor 12 to compare a data input with stored data, the processor transmits a command signal via memory read control lead 100 while at the same time it enables EEPROM 14 to be actuated by power supply 56 by transmitting another command signal via lead 102. Assuming that no switch of bus 24 is closed, then the stored bytes of a data stream in memory designated area "0" have been selected for comparison. Accordingly, each byte of a stored input is successively transferred (loaded) via data bus 16 to its associated first, second or third register 112, 114 or 116 as indicated by blocks 156, 158 and 160. In order that each byte of a stored input is properly removed from its respective part of a designated memory area, processor 12 functions to provide appropriate binary encoded signals via address bus 22 to memory 122. Step 162 indicates when a data stream is received by processor 12 via the key pulse thereof.

With the processor still in the decode mode as the set data stream input is received by accumulator 104, a first 8-bit byte of the input is outputted in parallel format and loaded in first register 112, as specified by block 164. If the loaded 8-bit byte of the input compares with a loaded 8-bit byte of the stored input as selected from EEPROM 14, then the routine continues (block 168). Otherwise the routine terminates (see step 172). A second 8-bit-byte of the set input is received by accumulator 104, outputted in parallel format and loaded in second register 114 (step 170). If it compares with second addressed byte of EEPROM 14 the routine continues as specified by block 176. Otherwise it is terminated (block 182). A third 8-bit byte input of the input is received and outputted by accumulator 104 then loaded into third register 116 (step 178). If the third 8-bit byte input compares with the third addressed input from EEPROM 14 the routine continues (block 180). Otherwise it terminates (block 184). If the data input compares with the addressed stored input of EEPROM 14 then the input data stream is also tested for a command bit signal as a part thereof. If such a command bit signal occurs in the data input being compared, processor 12 provides output 92 with signals via leads 94 and 96 for indicating comparison between an input and a stored input (block 186) thereby ending the routine (block 188). It is noted here in addressing a stored input of EEPROM 14 to be compared with an input, the memory area designated "0" would have its stored input unloaded unless one of the switches 40, 42, 44, 46, 48, 50 or 52 is selected by the user. Assuming that the user fails to select a switch of bus 24, then the memory designated "0" of EEPROM 14 would be unloaded as the result of signals from processor 12 via leads 100 and 102. Further, address bus 22 via its binary encoded leads 23 and 25 progressively unloads each 8-bit byte from the memory designated area "0" in proper and successive fashion to its associated register 110, 112 and 114 all in following the first part of routine of FIG. 4A, blocks 156, 158 and 160 as aforedescribed.

Figure 5:
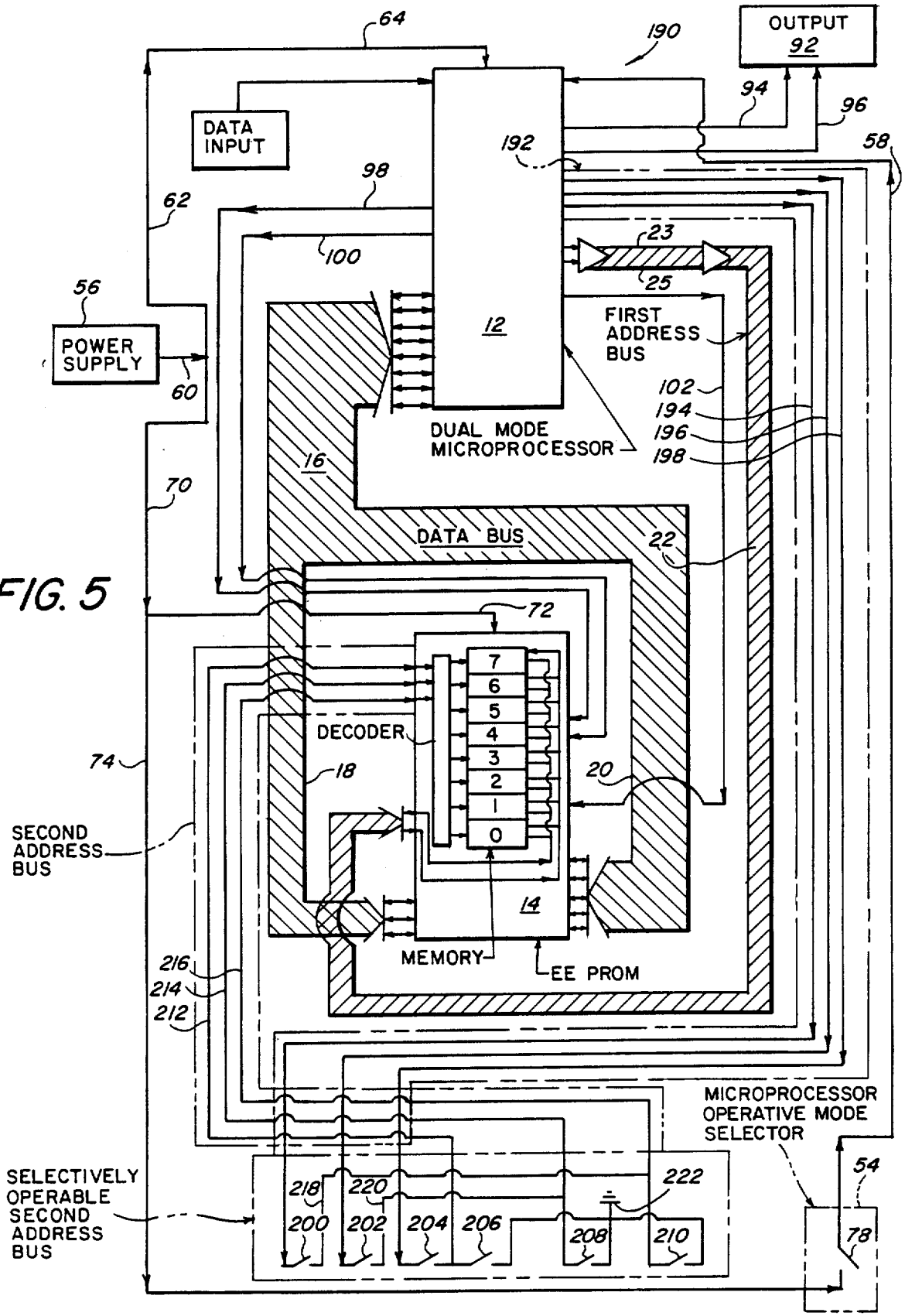
FIG. 5 is a diagrammatic view similar to FIG. 1 and illustrates another embodiment of the improved serial data word processing arrangement.

With reference to FIG. 5, a slightly modified arrangement 190 is provided. It is to be understood that elements of arrangement 190 in FIG. 5 having the same reference numerals as elements of arrangement 10 in FIGS. 1-2 are corresponding elements. Second address bus 192 of arrangement 190 is comprised of a set of three leads 194, 196 and 198 extending from processor 12. Second bus 192 is provided with first and second sets of selectively operable manual switches. The first set of switches is made up of three switches 200, 202 and 204. The bridge-contact terminal of each switch 200, 202 and 204 is series connected respectively to its associated lead 194, 196 and 198 of bus 192. The second set of switches is a set of three switches 206, 208 and 210. The bridge-contact terminal of each switch 206, 208 and 210 is series connected to its associated lead 212, 214 and 216 of another set of three leads of bus 192 that is connected to EEPROM 14. The nonbridge contact terminal of each switch 200 and 202 of the first set is parallel connected by branch leads 218 and 220 to leads 216 and 214 respectively of the second set of three leads of bus 192. Nonbridge-contact terminal of switch 204 of the first set is directly connected to lead 212 of the second set of three leads of bus 192. Each nonbridge-contact terminal of each switch 206, 208, and 210 of the second set is parallel connected by three branch leads to a common ground 222.

It is now assumed in the species of FIG. 5 that mode selector switch 54 is in the open position for selecting the operative mode of processor 12 to encode or store three parallel converted bytes of a set data input in a preselected memory area of EEPROM 14. To this end, the operator selects all switches 200, 202 and 204 of the first set to be in the open position. Then the operator selects any switch of the second set of switches 206, 208 and 210 to be either in the open or closed position. Depending on the selection for the second set of switches a particular area of the memory of EEPROM 14 will be selected for storing the parallel data bytes of a data stream such as, e.g., memory designated area "4" of EEPROM 14 as shown in FIG. 2. As a data input stream is received by processor 12 in the species of FIG. 5 then the aforedescribed encoding routine of FIG. 3 will in effect be followed. To this end, leads 23 and 25 of address bus 22 will transmit binary encoded signals for progressively storing each parallel 8-bit byte of the input in proper fashion in its designated area of the memory of EEPROM 14.

Figure 6:
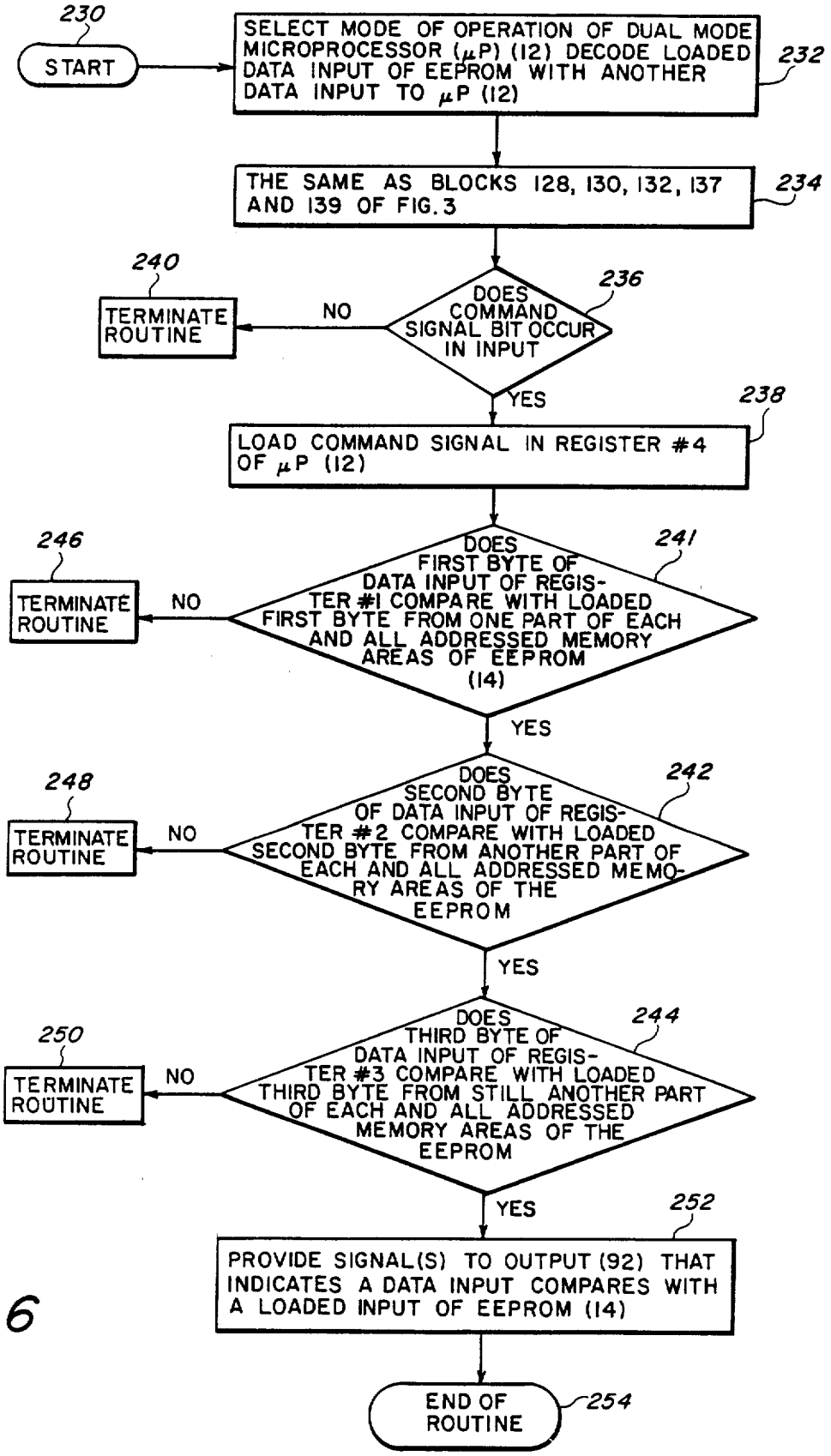
FIG. 6 is a schematic view of a flow chart for an operative embodiment of the species of FIG. 5 when it is in a decoding operative mode.

On the other hand, when mode selector switch 78 is closed and processor 12 of FIG. 5 is now in the decoding or data input/stored data comparison mode, all switches 200, 202 and 204 of the first set are closed while all switches 206, 208 and 210 of the second set are opened. Accordingly, each lead of the first set of leads 194, 196 and 198 of bus 192 are directly connected to its associated lead 216, 214 and 212 of the second set of leads thereof. With reference to FIG. 6, the routine has been started and the processor mode selected (see blocks 230 and 232). As indicated by step 234, this part of the routine of FIG. 6 is the same as the interim part of the routine of FIG. 3 as evidenced by blocks 128, 130, 132, 137 and 139 and as aforedescribed. With a set data input received and with each 8-bit byte of a set of three bytes outputted in parallel format and stored in their respective part of a designated memory area such as "0" the routine of FIG. 6 then checks to see if the data input included a command signal and if so the routine continues by storing the command signal in register four of the processor as substantiated by blocks 236 and 238 or blocks 238 and 240 if no command signal.

Since address bus 192 is directly connected to EEPROM 14 through interconnected leads 194, 196 and 198; and 216, 214 and 212 respectively, the processor via address buses 22 and 192 and data bus 16 functions to search all eight memory areas (0–7) of the EEPROM, unload each loaded memory area in processor registers 112, 114 and 116 and compare the unloaded bytes of each stored input from the EEPROM with its associated byte of a data input all in processor registers 112, 114 and 116. If the loaded bytes of a given stored input fully compares with the loaded data input bytes then the sequence of blocks 240, 242 and 244 occurs in FIG. 6. Otherwise routine termination occurs at a block 246, 248 or 250 if no comparison is the result at any step 240, 242 or 244 between the loaded input bytes of processor registers 112, 114 and 116 and any stored input bytes of an encoded input loaded in the processor registers. Assuming that full comparison occurs between a data input and a stored data input the register 4 of processor 12 functions with a command signal registered therein to provide an output to element 92 as substantiated by block 252 before the end of the routine (block 254).

Obviously many modifications and variations of the present invention are possible in light of the above teachings. It is, therefore, to be understood that, within the scope of the appended claims, the invention may be practiced otherwise than as specifically described.

What is claimed is:

1. A serial data EEPROM processing arrangement comprising:

a dual mode microprocessor comprising an accumulator and at least 3 registers;

means for inputting serial data in bytes of 8 bits or less to the accumulator of said dual mode microprocessor;

means for outputting parallel data from the registers of said dual mode microprocessor;

an elecrtonically erasable and programmable read only memory (EEPROM) electrically connected to said dual mode microprocessor;

a data bus connecting the registers of said dual mode microprocessor to said EEPROM;

an address bus interconnecting said dual mode microprocessor with said EEPROM;

a manually selectable address bus comprising switches to designate which area of the EEPROM is addressed by said dual mode microprocessor;

means for manually switching said microprocessor between an encoding and a decoding mode; and means for outputting an electrical signal when the serial data inputted to said dual mode microprocessor matches the data in said EEPROM.

* * * * *